United States Patent
Hartung et al.

(10) Patent No.: US 8,756,648 B2
(45) Date of Patent: Jun. 17, 2014

(54) PROVISION OF MARKED DATA CONTENT TO USER DEVICES OF A COMMUNICATIONS NETWORK

(75) Inventors: Frank Hartung, Herzogenrath (DE); Daniel Catrein, Herzogenrath (DE); Thomas Rusert, Kista (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 89 days.

(21) Appl. No.: 13/062,653

(22) PCT Filed: Sep. 8, 2008

(86) PCT No.: PCT/EP2008/061868
§ 371 (c)(1),
(2), (4) Date: Apr. 4, 2011

(87) PCT Pub. No.: WO2010/025779
PCT Pub. Date: Mar. 11, 2010

(65) Prior Publication Data
US 2011/0314511 A1    Dec. 22, 2011

(51) Int. Cl.
*H04N 7/173* (2011.01)
*H04N 7/16* (2011.01)

(52) U.S. Cl.
USPC ........... 725/151; 425/114; 425/116; 425/131; 425/146

(58) Field of Classification Search
USPC .......................... 725/114, 116, 131, 146, 151
See application file for complete search history.

(56) References Cited

U.S. PATENT DOCUMENTS

| | | | |
|---|---|---|---|
| 4,297,676 A * | 10/1981 | Moriya et al. | 382/287 |
| 8,171,567 B1 * | 5/2012 | Fraser et al. | 726/32 |
| 2002/0168069 A1 * | 11/2002 | Tehranchi et al. | 380/235 |
| 2003/0067872 A1 * | 4/2003 | Harrell et al. | 370/229 |
| 2003/0103645 A1 | 6/2003 | Levy et al. | |
| 2005/0141704 A1 | 6/2005 | Van Der Veen | |
| 2006/0005029 A1 | 1/2006 | Petrovic et al. | |
| 2007/0208630 A1 * | 9/2007 | Chatter et al. | 705/26 |

FOREIGN PATENT DOCUMENTS

| | | |
|---|---|---|
| EP | 1221816 A2 | 7/2002 |
| WO | 01/67667 A1 | 9/2001 |

OTHER PUBLICATIONS

Li, Z. et al., "Design and Analysis of a Scalable Watermarking Scheme for the Scalable Audio Coder", IEEE Transactions on Signal Processing, Aug. 2006, pp. 3064-3077, vol. 54, No. 8, IEEE.
Ohm, J., "Advances in Scalable Video Coding", Proceedings of the IEEE, Jan. 2005, pp. 42-56, vol. 93, No. 1.
Hartung, F. et al., "Multimedia Watermarking Techniques", Proceedings of the IEEE, Jul. 1999, pp. 1079-1107, vol. 87, No. 7.
Wang, Y. et al., "Multiple Description Coding for Video Delivery", Proceedings of the IEEE, Jan. 2005, pp. 57-70, vol. 98, No. 1.

* cited by examiner

*Primary Examiner* — Kiu Oanh T Bui
(74) *Attorney, Agent, or Firm* — Coats & Bennett, PLLC

(57) ABSTRACT

The invention refers to a method to be used in a telecommunication network for providing individually marked digital signals (S1, S2) to be transmitted to a plurality of recipient user devices (UE1, UE2), wherein a content digital signal (S0) is received together with one or a plurality of mark signals (M1, M2), and wherein an individually marked signal (S1, S2) to be provided to one of the user devices (UE1, UE2) is generated by combining the content signal (S0) with one or a plurality of mark signals (M1, M2). The invention further refers to a program and to devices for performing the method.

21 Claims, 2 Drawing Sheets

PROVISION OF MARKED DATA CONTENT TO USER DEVICES OF A COMMUNICATIONS NETWORK

TECHNICAL FIELD

The present invention relates to digital watermarking.

BACKGROUND

In digital communication networks, transmission services of multimedia data, e.g. music download services, video streaming services and TV over Internet Protocol (IPTV) services are increasingly offered and used.

Subscribers to such services can download digital content, e.g. media data like audio, 3D-audio, video or 3D video files to corresponding user terminals, e.g. to mobile phones, computers or television receivers. Without an efficient measure of protection, digital data can be extensively used by any recipient, e.g. being copied, modified and/or distributed to arbitrary further recipients. The content providers however want to restrict the use of the distributed multimedia data. One technical option is the use of Digital Rights Management (DRM) technologies as e.g. being defined by the Open Mobile Alliance (OMA) that is a standardization body in the field of mobile communication, addressing controlling content being transmitted within mobile networks, e.g. preventing downloaded content from being forwarded or copied to further users.

An alternative solution for protecting from unauthorized use of transmitted content can be derived by applying so-called (digital) watermarking denoting technologies to embed information robustly and imperceptibly into the multimedia data. The term watermark refers to well-known techniques marking paper by placing recognizable images or patterns into the paper. Watermarking does not prevent copying or distribution, but it allows e.g. identifying individual versions of the multimedia data, and therewith identifying users that provide unauthorized copies to further recipients. A general description of watermarking technologies can be gathered e.g. from the article "Multimedia Watermarking Techniques", Proceedings of the IEEE, vol. 87, no. 7, pp. 1079-1107, July 1999 of F. Hartung and M. Kutter.

Watermark encoding however might be computationally complex and time-consuming, especially if a large amount of data to be watermarked, e.g. the data of a digital video stream. Thus, watermarking is preferably done centrally at a powerful network node of a corresponding internet service provider's network. Central watermarking however means that a plurality of differently marked multimedia signals have to be distributed from a server of an internet service provider over suitable nodes of an access network to a corresponding plurality of end user terminals. Such suitable nodes might comprise so-called Digital Subscriber Line Access Multiplexers (DSLAM) connecting multiple customer Digital Subscriber Lines (DSL) to a high-speed backbone line using multiplexing techniques, and so-called broadband remote access server (BRAS) aggregating user sessions from the access network, thereby routing traffic to and from the digital subscriber line access multiplexers (DSLAM) on an Internet service provider's (ISP) network.

If the watermarked signals are generated in the core network, a plurality of copies of the multimedia stream needs to be transmitted, as watermarked signals are to be individual for each user (in other words, it is not possible to apply multicast or broadcast techniques for gaining transmission resources).

However, the bandwidth available for a broadband provision of multimedia streams across a network is a scarce resource.

SUMMARY

It is an object of the present invention to improve the distribution of data content.

This object is achieved by the independent claims. Advantageous embodiments are described in the dependent claims.

An idea of watermarking a content to be distributed to a plurality of end user devices of a telecommunications network is to generate a plurality of individually marked digital signals each to be provided to a different recipient user device, or to different groups of user devices, wherein each marked digital signal forms a unique version of the digital signal allowing identifying an individual recipient user, or an individual group of recipient users that has (illegally) further distributed the data signal.

In an embodiment of the invention thereto, a node or device close to an end user device receives a content digital together with one or a plurality of mark or watermark signals from a remote server, and generates individually marked signals to be transmitted to the end user devices by individually combining the content signal with the one or the plurality of mark signals. This approach avoids the need of sending a plurality of different versions (each differently watermarked) of the same content over the network. This is a significant advantage, especially if e.g. high quality video content is to be distributed, as corresponding video streams have a high bandwidth demand. As example, standard quality MPEG 2 IPTV content requires 2-6 Mbps per channel, whereas future high definition TV (HDTV) will require up to 20 Mbps per channel. Compared thereto, the marking signals require a muss less bandwidth. Thus, the invention allows for significantly saving transmission resources as only one copy of the content data stream needs to be transmitted over the network, and as the watermark signal streams consume much less bandwidth compared to the content data stream. A further advantage is that the complexity of the remote server can be reduced, as watermarking functionality is shifted to the watermarking nodes.

As further advantage of the invention, it is possible to obtain a high level of security of detecting unauthorized content copies by combining a higher number of different watermark signals e.g. 5, 10, 20, 100, 1000 or even more different watermark signals, as due to the relatively narrow bandwidth required for transmitting each mark signal, the high number of watermark signals can be conveyed without much impact to the consumed bandwidth. This allows easily creating a high number of easy identifiable individual watermarked signals, e.g. out of n mark signals, $2^n$ (2 to the power of n) combinations are possible at each instance of time. Furthermore, the combination pattern can change over time, so that the total number of possible combinations is further significantly increased.

In an embodiment, the combination of the content signal and the mark signal(s) is performed according to an individual combination pattern (or switching sequence) associated to each user device or each group of user devices. Each combination pattern defines how the one or plurality of mark signals (M1, M2) and the content signal are to be combined to form an individual marked signal. Such combination might be performed by intermittently adding a mark signal to the content signal according to the switching sequence (in this case the switching sequence might be a sequence of binary values; if a plurality of mark signals is combined, these mark signals might be each different intermittently added according to a sequence of a multiple of values).

In an embodiment, the combination pattern might be used to identify the end user. Thereto, the patterns are kept stored within the network to be able to later-on identify an end user, if this user has used the received data illegally (i.e. contrary to his contract or to applicable law).

The node close to the end user might be an access node like a DSLAM or a BRAS of a DSL IPTV network as discussed in the background section. Such node might be located in an access network within a telecommunications network serving to providing access to a certain number of user terminals e.g. residing at a certain local region. A plurality of such networks might be provided to cover a region being segmented into a corresponding number of local regions. The content server might be located within a service provider's network providing content data over a core network and/or a metro network to the access networks.

In an alternative, the device close to the end user is a set top box at user premises, or as sub device within the user device, or in other words, the watermarking function is integrated into the user device or the set top box. In an embodiment thereto, the signals received, at least the content signal, are protected against eavesdropping (e.g. encrypted), before being combined. In further embodiment thereto, a trusted watermarking entity is inserted into the end user device or the set top box that performs the watermarking, similar to the requirement on a trusted DRM module in an end user device, if DRM is deployed.

To ensure an efficient multimedia delivery, multimedia data is typically encoded prior to delivery to reduce the amount of data actually being transferred over the network. According to an embodiment of the invention, a so-called layered coding technique is used to code/decode the content data stream and watermark signals. Layered coding refers to a particular type of motion-compensation-based video coding scheme representing a family of signal representation techniques in which the source information is partitioned into sets being referred to as layers. The layers might be organized so that the lowest layer or base layer contains the minimum information for intelligibility. The other layers, also being referred to as enhancement layers, contain additional information that incrementally improves the quality of the video. With layered coding, the various layers can be sent over the network as separate sub-streams, where the quality level of the video increases as each sub-stream is received and decoded. A decoder that receives the base layer and the enhancement layers can be configured to choose and decode a particular subset of these layers to get a particular quality according to its preference and capability. A description of such techniques is e.g. being defined in a standard named "Advanced video coding for generic audiovisual services" being published as part of or enhancement to the document "ITU-T Recommendation H.264" by the ITU-T International Telecommunication Union (ITU). Applying such standard might allow for re-using already implemented functions within the node, if such standard is implemented.

In an embodiment thereto, one or a plurality of enhancement layers is used to encode a watermark signal at the content server. At the watermarking node the content signal coded into the base layer and possibly in further enhancement layers, and the mark signal(s) coded into the enhancement layer(s) are combined to form the individual watermarked version(s) of the content signal.

In an embodiment, the base layer does not carry the video stream itself i.e. stream in consumable form, but the video stream is split between the base layer and the enhancement layers, so that the base layer alone is not intelligible; in other words, in order to generate a legible stream, the signal decoded from the base layer must be combined with the signal(s) decoded from the corresponding enhancement layer(s).

In an embodiment, the content signal and/or the mark signals being received by the watermarking node is/are encoded according to a certain coding scheme. After reception, the watermarking node performs a step of decoding or at least partially decoding this/these signal(s) to obtain the content signal and/or the mark signals. Accordingly the marked signal(s) to be sent to the user devices might be encoded according to this coding scheme or according to any other appropriate coding scheme, e.g. according a coding scheme being defined in the standard H.264/AVC of the International Telecommunication Unit (ITU), before being transmitted to the corresponding user devices.

The watermarking node might receive control information to control the functions of the watermarking node. Such control information might explicitly comprise the combination patterns or might comprise information to produce the combination patterns to be used for encoding within the watermarking node. Such information to produce the combination patters might comprise a so-called executable or algorithm to be performed in the watermarking node.

The control information might be transmitted either from the content server or from any other node, wherein that node might be associated with the content server, to the watermarking node. This information might be transmitted either together with the content signal and the mark signal(s) over the same physical channel or over a separate physical channel. Further alternatively this information is send prior to the transmission of the content signal. In a further embodiment, the watermarking node does not receive any control information related to the combination patterns. In this embodiment, the watermarking is responsible for selecting the combination patterns itself.

In order to protect the content signal, the mark signal(s) and/or the control information, these signals might be encrypted before being transmitted to the watermarking node. In this case, the watermarking node performs a decryption of the encrypted received signals.

The present invention also concerns computer programs comprising portions of software codes in order to implement the method as described above when operated by a respective processing unit of a user device and a recipient device. The computer program can be stored on a computer readable medium. The computer-readable medium can be a permanent or rewritable memory within the user device or the recipient device or located externally. The respective computer program can be also transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
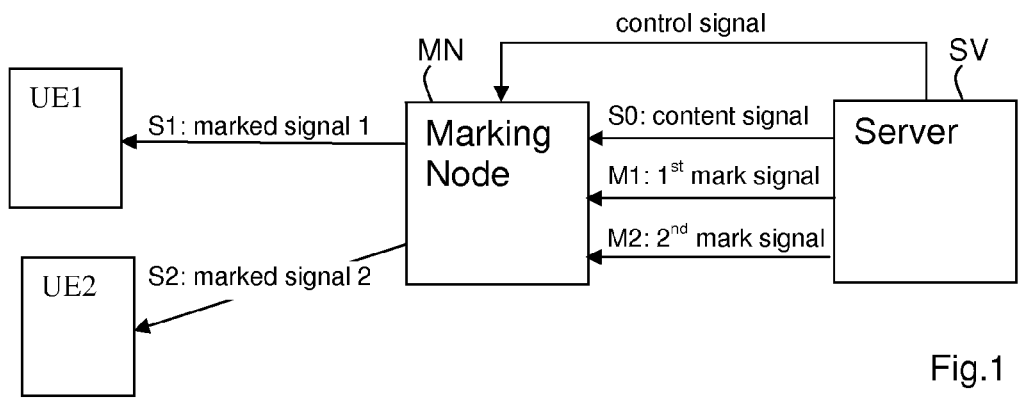
FIG. 1 shows a simplified block diagram representing exemplary nodes of a communications network for providing individually marked data signals to user terminals.

FIG. 1 illustrates an arrangement of exemplary nodes of a communications network for distributing media streams or signals, i.e. a sequence of data packets each comprising a certain amount of content information, comprising by way of example a content server SV and a marking node MN being connected to each other, wherein the marking node MN is by way of example further connected to each a first user device UE1 and a second user device UE2. The server SV provides by way of example a content signal S0, a first (water)mark signal M1 and a second (water)mark signal or mark M2 to the watermarking or marking node MN. The content signal S0 as well as the mark signal M1 and M2 might be video signals. The marking node MN and the content server SV may further exchange control information over a separate physical channel. Alternatively the control information might be transmitted over the same physical channel as the content signal S0 (in-band) or might be generated within the watermarking node. By combining the content signal S0, the first mark signal M1 and the second mark signal M2 in dependence of the control information, the marking node MN generates a first (water)marked signal S1 and a second (water)marked signal S2 to be provided to each the first user device UE1 and the second user device UE2 respectively.

The content server SV might be any network device being able to create new content or to integrate existing content from internal and external content sources and to provide this content in form of a media stream, in the following also being referred to as content signal. Such signal might refer to any kind of Video, Television (TV), audio or any other consumable media content. Services delivered can e.g. be so-called Video on Demand (VoD) services, IP (Internet Protocol) TV, mobile TV, i.e. TV content to be delivered to user devices of a mobile communications network or stations, interactive TV, interactive or co-operative games, pushed video clips, or audio media.

The user devices UE1 and UE2 might be any terminals of any digital communication networks such as the internet (e.g. personal computers), TV sets via set-top box, IP connected TV, or terminals of any mobile communications network, e.g. a GSM based network and or any development thereto (e.g. GPRS, EDGE), an UMTS based network, CDMA based network or a long term evolution (LTE) network.

The content signal by way of example might be passed from the content server SV over a core network and/or a metro network to an access or distribution server that might be part of an access network, providing by way of example access to the user devices UE1 and UE2 of users that wishes to receive the content signal The marking node MN therein might be the distribution server itself, e.g. a server acting as Digital Subscriber Line Access Multiplexer (DSLAM) or as broadband remote access server (BRAS) as discussed in the introduction.

Alternatively, the functions of watermarking and distribution might be realized in separate interacting nodes.

If a plurality of users (above a certain number) wish to receive the same content, it is well-known to reduce the bandwidth demands for the delivery of the corresponding data within the network by using so-called multicast techniques. Multicasting means to provide one data stream to be distributed to a plurality of end users. However, as it is desired to use watermark techniques shall to be able to detect any individual user that has (illegally) used such content, each user must receive an individually marked version of the content. The embodiment described here allows providing a plurality of different watermarked versions each to different user devices without any need to transmit different versions of the content signal in parallel from the content server SV to the marking node MN.

In the easiest solution, each one of the marked signals S1 and S2 is generated by combining the content signal S0 with each one different mark signal M1 or M2. This means that the number of different mark signals to be provided to an access server needs at least to be as high as the number of user terminals served by the same access server and receiving the same content. Alternatively or additionally, it is also possible to combine a plurality of mark signal with the content signal in order to get a marked signal, e.g. to get a third marked signal by combining the first mark signal M1, the second mark signal M2 and the content signal S0.

Figure 2A:
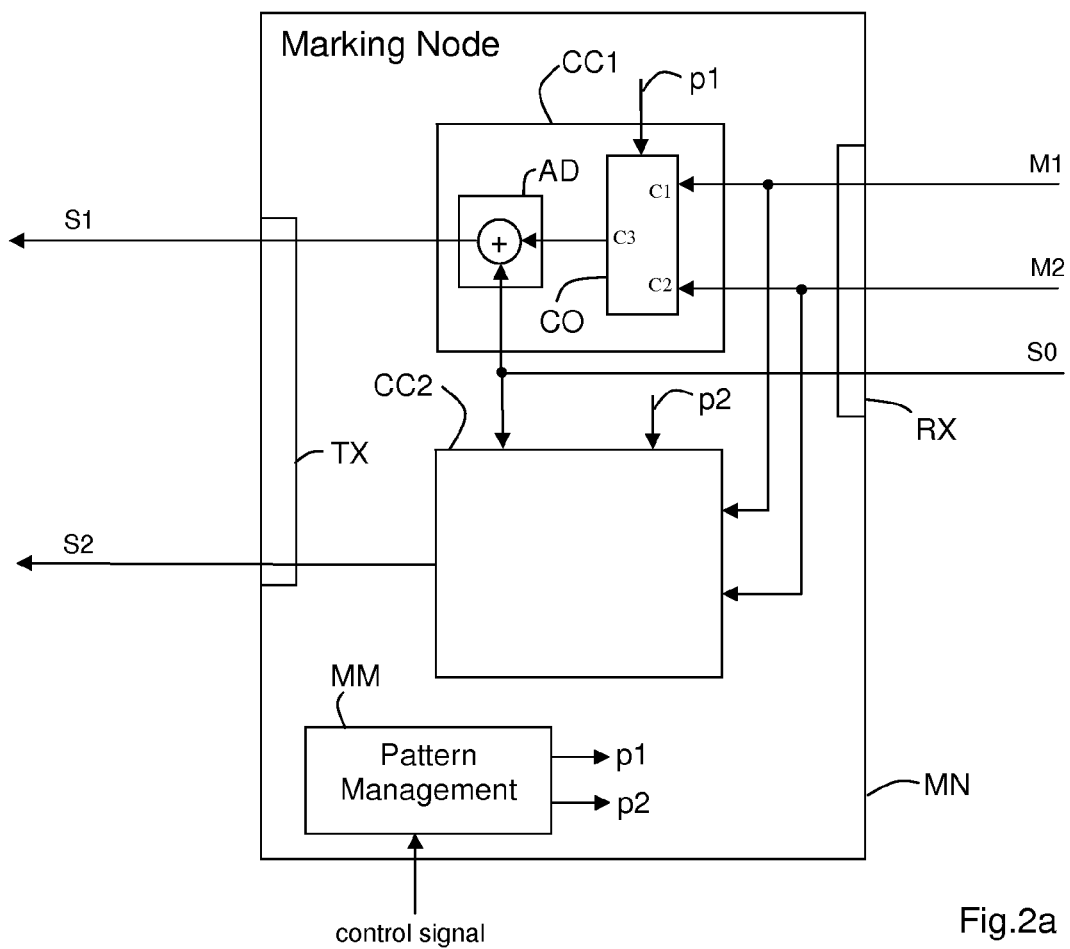
FIG. 2a shows a more detailed block diagram of an exemplary marking node of FIG. 1.

As being discussed in the following under FIG. 2*a*, a much higher number of marked signals might be generated out of one or only a few mark signals by using individual combination patterns for controlling the generation of the marked signals, and generating an association of user identifications and the individual combination patterns used for encoding the marked signal provided to the corresponding user devices.

In the following, more detailed aspects of the invention will be explained. Thereto, FIG. 2*a* shows a block diagram of exemplary blocks of the marking node MN, the marking node comprising a receiver RX for receiving the content signal S0 and the mark signals M1 and M2, a transmitter TX for transmitting the marked signal S1 and S2, a plurality of similar coding blocks, whereof by way of example a first coding block CC1, an a second coding block CC2 are depicted here.

For the case that the content signal S0 and the mark signals M1 and M2 are video signals, these signal might be transmitted from the content server SV being encoded, e.g. according to the standard H.264/AC as being mentioned above. Thereto, not shown in the figure, a signal decoder might be coupled to the receiver RX in order to (partially) decode the video signals S0, M1 and M2. Accordingly, a signal coder might be coupled to the transmitter TX in order to encode the signals generated by the coding blocks to be transmitted by the transmitter TX as the marked signals S1 and S2.

The marking node MN comprises a pattern management module MM being responsible for controlling, managing or generating different combination patterns within the marking node MN. In the current example, the pattern management module MM transmits a first combination control signal p1 to the first coding block CC1 and a second combination control signal p2 to the second coding block CC2. Each coding block CC1 and CC2 is generating an individually marked version S1 and S2 to be provided to each one user device UE1 and UE2 as shown in FIG. 1, wherein the first marked signal S1 is generated as a function of the content signal S0, the first mark signal M1, the second mark signal M2 and the first combination control signal p1, and the second marked signal S1 is generated as a function of the content signal S0, the first mark signal M1, the second mark signal M2 and the second combination control signal p2.

By way of example, the first coding block CC1 has been broken down to sub block level, showing an adder AD and a combination module CO. The combination module CO by way of example shows two signal inputs C1 and C2 receiving each the first mark signal M1 and the second mark signal M2 respectively. Further the combination module CO comprises a control input for receiving the first combination control signal p1, and a signal output C3 providing a combined mark signal. The combined mark signal is provided to a first input of the adder AD. Further the content signal S0 is provided to the second input of the adder AD. The adder AD adds the content signal S0 and the combined mark signal to form the first marked signal S1.

In the example shown here, the mark signal are combined before being further combined with the content signal S0. It is to be noted that any other sequence of combination is possible, e.g. first combining the content signal S0 with the first mark signal M1 and then combining the resulting signal with further mark signals. Further alternatively, the signals S0, M1 and M2 might be combined all together at one stage.

Figure 2B:
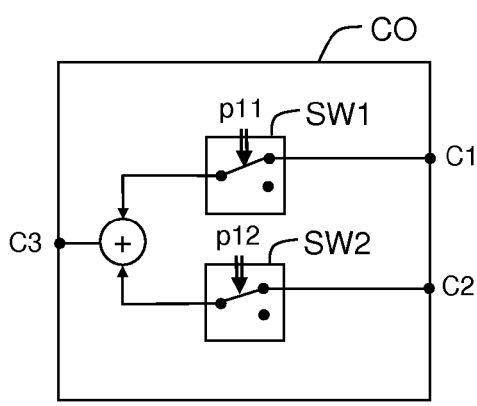
FIG. 2*b* shows a more detailed block diagram of an exemplary marking signal combining block of the marking node of FIG. 2*a*.

In the following, exemplary functions of the combination module CO will be described in more details. Thereto, FIG. 2b shows a more detailed block diagram of the combination module CO of FIG. 2a. By way of example, the combination module CO comprises two switches SW1 and SW2 and a further adder, the first switch switchably connecting the first signal input C1 with the further adder and the second switch SW2 switchably connecting the second signal input C2 with the further adder.

The switches are activated each in response to a first switching pattern p11 and a second switching pattern respectively p12, wherein both switching patterns p11 and p12 are from the first derived from the first combination control signal p1. Bay way of example, the switching periods of both switches might be in the range of some seconds; in other words each of the switches connects or disconnects the further adder from the first signal input C1 and the second signal input C2 according to each the switching pattern. Thereto, the switching pattern p11 and p12 might each comprise a sequence of binary values, wherein each value indicates to connect or to disconnect. (The patterns might be cyclically repeated.) The output of the further adder is coupled with the signal output C3, wherein this output provides the combined mark signal to be provided to the input of the adder AD described above.

Figure 2C:
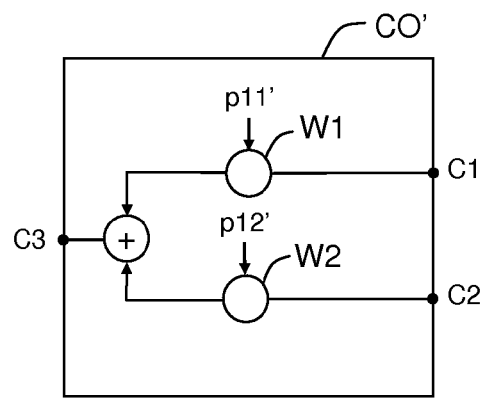
FIG. 2*c* shows a more detailed block diagram of an alternative marking signal combining block of the marking node of FIG. 2*a*.

In an alternative embodiment, a kind of weighted switching or combination might be performed instead of digital switching. Thereto the coding blocks CC1 and CC2 might comprise one or a plurality of combination modules that combine signals using different weighting factors. Thereto, patterns might be used that comprise sequences of values (e.g. being represented as multi-bit values), wherein each of these values indicate a factor to be applied to the signal to be combined. Thereto, FIG. 2c shows a block diagram of an exemplary alternative combination module CO'. By way of example, this module has a similar structure compared to the combination module CO of FIG. 2b, but comprises two weighting modules W1 and W2 instead of the switches SW1 and SW2. The first weighting module W1 connects the first signal input C1 with the adder of the combination module CO', and the second weighting module connects the second signal input C2 with said adder. The weighting modules each receive a weighting pattern p11' and p12' respectively. Each weighting pattern might comprise a sequence of values between a minimum value and a maximum value, e.g. between −1 and 1 (for illustration, an exemplary section of such sequence might be {−1, 0.6, −0.3, 1, 0, ... }). Each of the weighting modules performs a weighting in accordance to each the corresponding weighting pattern, e.g. by successively performing a multiplication of the input signal with the values of the weighting pattern. The weighted signals, as output signals of the weighting modules, are provided to the adder of the combination module CO' to generate the combined mark signal.

In an embodiment, the content signal S0 and the marked signals S1 and S2 are each digital signals that might be represented by sequences of multi-bit values, e.g. of 8 or 16 bit values.

A plurality of alternative possibilities exists for combining the content signal S0 with watermark signals M1, M2 according to individual patterns, e.g. providing a pattern for controlling a switching of only one mark signal to generate the intermediate mark signal, to switch between a number N of mark signals, wherein N might be a higher number than 2. Thereto, it is possible to provide a plurality of parallel and/or serially connected digital switches as shown in FIG. 2.

The control signal conveyed from the content server SV to the marking node MN might comprise an information of the combination patterns to be used for coding. In a first embodiment thereto, the control signal comprises information representing an explicit pattern, e.g. a sequence of digital values. Alternatively the control signal comprises information, how the pattern is to be derived, e.g. conveying an identification number identifying a specific combination pattern to be looked up in a look-up table and/or to be requested from another node or providing an executable to be executed within the watermarking node to derive the combination information.

The content signal S0, the first watermark signal M1 and the second watermark signal M2 (and possibly further watermark signals Mi (i=3, 4 ... ) might each be encoded as normal video streams that are decoded and combined at the watermarking node MN.

In an embodiment, only a partial decoding is necessary to obtain the content signal and the mark signals. In this case the watermarking node performs a partial decoding of the received signal, and performs a corresponding partial encoding of the marked signal to be transmitted to the user devices.

Alternatively the streams might be combined to fewer streams, e.g. using so-called Multiple Description Coding (MDC) techniques, which fragment a single media stream into a plurality of independent sub streams referred to as descriptions. The packets of each description might be routed over multiple, possibly (partially) disjoint paths between the content server SV and the marking node MN and might be independently decoded by the marking node MN.

It is a further idea of the invention to apply a layered coding scheme for distributing the content signal and one or a plurality of watermark signals. Thereto, the content signal SO might be encoded as base layer or as base layer plus a certain number of enhancement layers (in order to provide a scalability of quality and/or in order to avoid that the decoded base layer being legible). The mark signal(s) signal M1 and M2 might be encoded (each) as enhancement layer(s). Alternatively, one of the mark signals M1 and M2 might be encoded as base layer and the content signal S0 might be encoded as one or a plurality of enhancement layers. Alternatively, the content signal might be split between the base layer and one or a plurality of enhancement layers.

One advantage of using the layered coding scheme might be that the watermarking node can be easily provided with a so-called bitstream rewriter that combines the separately transmitted layers carrying the signal S0, M1, M2.

Alternatively to performing the marking function within the network, e.g. close to a DSLAM or a BRAS of a DSL IPTV network, the watermarking function might be part performed close to the user, e.g. within the user device itself or within a set top box associated to the corresponding end user device.

In an embodiment, the combination pattern to be used for coding is kept remaining a secret for the end user. Thereto, the pattern is cryptographically protected, e.g. encoded with a protection that is known in the marking node. If the watermarking function is performed in the set top box or the end user device, such functions are preferably performed in a secured (tamper proof) circuit within such device.

In an embodiment, the resulting watermarked signals S1 and S2 are encrypted (and/or recompressed) in the watermarking node for further transmission.

Figure 3:
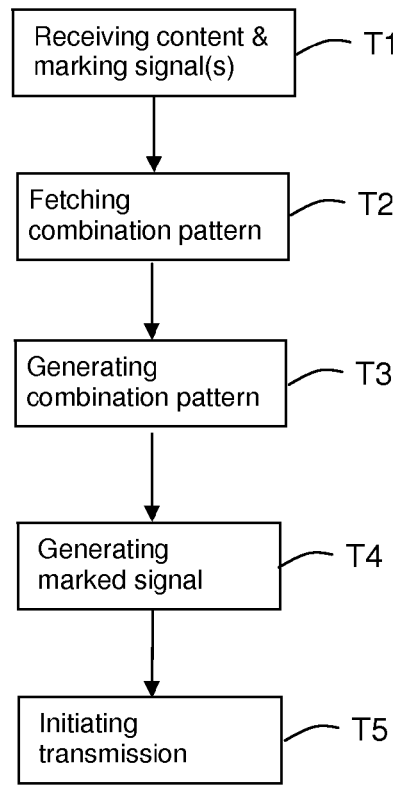
FIG. 3 shows an exemplary sequence for generating the individually marked data signals to be provided to the user terminals.

FIG. 3 shows an exemplary sequence of five steps S1-S5 for generating and the individually marked data signals at a watermarking node MN to be provided to the user terminals UE1 and UE2, according to the description of FIG. 2:

In a first step T1, the marking node MN receives the content signal S0 and one or a plurality of mark signals, e.g. M1 and M2;

In a second step T2, the marking node fetches encoding information for generating the combination pattern, e.g. by directly receiving a pattern or sequence from the content server SV, or by receiving an information to be used for generating a combination pattern. Such information might be received in-band together with the content signal and the marking signal (e.g. if the pattern is directly conveyed), or out-of-band (e.g. if the pattern is generated within the marking node on the base of the conveyed information);

In a third step T3, the combination pattern is generated;

In a fourth step T4, the marked signals, e.g. S1 and S2 are generated as a function of the content signal S0 and the mark signals M1 and M2, and the generated combination pattern; and In a fifths step T5, the transmission of the marked signals to the corresponding user devices UE1 and UE2 is performed or initiated.

As discussed above, a plurality of variations and enhancements of the above sequence are comprised by the invention; e.g. watermarking at the end user (end user device or set top box), encryption/decryption of the combination pattern, encoding/decoding of the marked signal, application of layered coding, etc.

The invention claimed is:

1. A method implemented by a device in a network, the network providing individually marked digital signals to be transmitted to a plurality of recipient user devices, the method comprising:
receiving a content digital signal and one or a plurality of mark signals, and generating an individually marked signal to be provided to one of the user devices by combining the content digital signal with the one or a plurality of mark signals,
wherein combining the content signal with the one or a plurality of mark signals is performed according to a layered coding scheme,
wherein the content signal is encoded into one or more layers included in a set of layers and the one or a plurality of mark signals are each encoded into one or more other layers in the set of layers, and wherein the content signal and the one or a plurality of mark signals are obtained by separately decoding each of the layers in the set of layers.

2. The method of claim 1, wherein the content signal is combined with the one or a plurality of mark signals according to an individual combination pattern, the combination pattern being associated to said one user device.

3. The method of claim 2, wherein combining the content signal with one of the mark signals comprises intermittently adding said mark signal according to the combination pattern.

4. The method of claim 3, wherein the combination pattern comprises one or a plurality of sequences of digital values, wherein one of the digital values of one of the sequences indicates to add an associated one of the mark signals to the content signal within a corresponding time period and another digital value indicates not to add said mark signal to the content signal within said time period.

5. The method of claim 2, wherein the combination pattern indicates to perform a combination at different weights of the mark signal, the combination pattern preferably comprising a sequence of values each indicating the weight to be applied within a corresponding time period.

6. The method of claim 2, further comprising generating information about an association of an identification of said user device and an identification of the combination pattern being used, for generating the individually marked signal to be transmitted to said user device.

7. The method of claim 6, wherein said information is stored within a memory to be used to identify a user device by analyzing captured data to identify a corresponding combination pattern.

8. The method of claim 1, wherein the set of layers includes a base layer and one or more enhancement layers according to a motion-compensation-based coding scheme, the one or more enhancement layers each providing incrementally improved quality over the base layer.

9. The method of claim 1, wherein an encoded input signal is received comprising at least one of: the content signal and the mark signals being encoded according to a certain coding scheme, wherein the encoded input signal is decoded or at least partially decoded to obtain at least one of the content signal and the mark signals, and wherein the one or a plurality of marked signals are encoded, to be transmitted to the corresponding user devices.

10. The method of claim 2, wherein the method is implemented by an access node within a telecommunications network.

11. The method of claim 1, wherein the access node comprises either:
a Digital Subscriber Line Access Multiplexer (DSLAM) configured to connect multiple customer Digital Subscriber Lines to a backbone line via multiplexing; or
a broadband remote access server (BRAS) configured to route traffic to and from the DSLAM.

12. The method of claim 1, wherein the method is implemented by a set top box associated with said one user device.

13. The method of claim 1, wherein the method is implemented by said one user device.

14. The method of claim 1, wherein the individually marked signal represents the digital content signal as individually watermarked.

15. A device to be used in a telecommunication network, the telecommunication network providing individually marked digital signals to a plurality of recipient user devices, comprising:
a receiver configured to receive a content digital signal and one or a plurality of mark signals, and
a processor configured to generate an individually marked signal to be provided to one of the user devices by combining the content digital signal with the one or a plurality of mark signals according to a layered coding scheme, wherein the content signal is encoded into one or more layers included in a set of layers and the one or a plurality of mark signals are each encoded into one or more other layers in the set of layers, and wherein the content signal and the one or a plurality of mark signals are obtained by separately decoding each of the layers in the set of layers.

16. The device of claim 15, wherein the device is one of:
a node associated with an access server providing a terminal access to the telecommunication network,
the access server,
a node associated with the user device, and
the user device.

17. The device of claim 15 wherein the device is a set top box associated with the user device.

18. The device of claim 15, wherein the individually marked signal represents the digital content signal as individually watermarked.

19. A content server to be used in a telecommunication network for providing media content to a plurality of recipient user devices, comprising:

a processor configured to generate a content data signal and one or a plurality of mark signals that, if combined with the content data signal according to a layered coding scheme, produce at least one individually marked signal for one of the user devices, and a sender configured to provide the content data signal and the one or a plurality of mark signals to a marking node that combines the signals according to the layered coding scheme, wherein the content signal is encoded into one or more layers included in a set of layers and the one or a plurality of mark signals are each encoded into one or more other layers in the set of layers.

20. The content server of claim 19, wherein the individually marked signal represents the digital content signal as individually watermarked.

21. A computer program product stored on a computer readable medium and comprising code that, when executed by a processing unit of a device, causes the device to facilitate providing individually marked digital signals to a plurality of recipient user devices, the code causing the device to generate an individually marked signal to be provided to one of the user devices by combining a content signal with one or a plurality of mark signals according to a layered coding scheme, both the content signal and the one or a plurality of mark signals having been received at the device, wherein the content signal is encoded into one or more layers included in a set of layers and the one or a plurality of mark signals are each encoded into one or more other layers in the set of layers, and wherein the content signal and the one or a plurality of mark signals are obtained by separately decoding each of the layers in the set of layers.

* * * * *